(12) United States Patent
Byon et al.

(10) Patent No.: US 8,300,105 B2
(45) Date of Patent: Oct. 30, 2012

(54) SHAKE CORRECTION MODULE FOR PHOTOGRAPHING APPARATUS AND PHOTOGRAPHING APPARATUS INCLUDING THE SAME

(75) Inventors: Kwang-seok Byon, Changwon (KR); Jung-su Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 12/378,228

(22) Filed: Feb. 12, 2009

(65) Prior Publication Data
US 2009/0201381 A1    Aug. 13, 2009

(30) Foreign Application Priority Data
Feb. 12, 2008    (KR) .................. 10-2008-0012604

(51) Int. Cl.
*H04N 5/228* (2006.01)
*G03B 17/00* (2006.01)
(52) U.S. Cl. ...................... 348/208.7; 396/55
(58) Field of Classification Search ............ 348/208.99, 348/208.7, 208.11; 396/55
See application file for complete search history.

(56) References Cited

U.S. PATENT DOCUMENTS

| | | | |
|---|---|---|---|
| 5,266,988 A * | 11/1993 | Washisu | 396/55 |
| 5,763,965 A * | 6/1998 | Bader | 310/12.06 |
| 5,822,623 A | 10/1998 | Urata et al. | |
| 5,835,799 A | 11/1998 | Washisu | |
| 5,883,742 A | 3/1999 | Kamata | |
| 6,631,042 B2 | 10/2003 | Noguchi | |
| 6,992,407 B2 * | 1/2006 | Kano et al. | 310/10 |
| 8,049,782 B2 | 11/2011 | Noji | |
| 2006/0018646 A1 * | 1/2006 | Stavely | 396/55 |
| 2006/0165397 A1 | 7/2006 | Uehara et al. | |
| 2007/0009244 A1 | 1/2007 | Takahashi | |
| 2008/0151063 A1 * | 6/2008 | Mogamiya | 348/208.2 |
| 2008/0187301 A1 | 8/2008 | Takahashi | |
| 2008/0284860 A1 * | 11/2008 | Wu et al. | 348/208.7 |
| 2009/0128637 A1 * | 5/2009 | Noji | 348/208.1 |
| 2009/0128640 A1 * | 5/2009 | Yumiki | 348/208.6 |
| 2009/0219402 A1 | 9/2009 | Schneider | |
| 2009/0252488 A1 | 10/2009 | Eromaki et al. | |
| 2010/0013939 A1 * | 1/2010 | Ohno et al. | 348/208.5 |

FOREIGN PATENT DOCUMENTS
JP    2000-194027 A    7/2000
JP    2004-101721 A    4/2004

\* cited by examiner

*Primary Examiner* — Timothy J Henn
(74) *Attorney, Agent, or Firm* — Drinker Biddle & Reath LLP

(57) ABSTRACT

A shake correction module for a photographing apparatus is provided. The shake correction module includes: a base plate; a slider member disposed on the base plate so as to be able to move in a first axis direction and a second axis direction crossing the first axis direction, and accommodating an imaging element; and first and second drive members that are disposed between the base plate and the slider member, wherein the first and second drive members are arranged to be symmetric with a centroid of the slider member, and move the slider member in the first axis direction and the second axis direction.

29 Claims, 5 Drawing Sheets

SHAKE CORRECTION MODULE FOR PHOTOGRAPHING APPARATUS AND PHOTOGRAPHING APPARATUS INCLUDING THE SAME

CROSS-REFERENCE TO RELATED PATENT APPLICATION

This application claims the benefit of Korean Patent Application No. 10-2008-0012604, filed on Feb. 12, 2008, in the Korean Intellectual Property Office, the disclosure of which is incorporated herein in its entirety by reference.

BACKGROUND OF THE INVENTION

1. Field of the Invention

The present invention relates generally to a photographing apparatus. More particularly, the present invention relates to a shake correction module for a photographing apparatus, so as to reduce the effect of shaking during photographing, and a photographing apparatus including the shake correction module.

2. Description of the Related Art

Along with the widespread use of photographing apparatuses such as digital still cameras and digital video cameras, the desire of users to obtain higher quality photos and motion pictures is increasing.

Shake correction modules are increasingly being adopted in photographing apparatuses to prevent degradation in the resolution of photos due to shaking of the photographing apparatuses by the user. A conventional shake correction module performs a shake correction function by moving a shake correction lens or imaging pickup device to counteract the shaking of the photographing apparatus by the user. Although various shake correction modules are known in the art, a shake correction module that is miniaturized and which has an improved shake correction function would be an important improvement in the art.

SUMMARY OF THE INVENTION

According to an aspect of the present invention, there is provided a shake correction module for a photographing apparatus. An embodiment of the shake correction module comprises: a base plate; a slider member disposed on the base plate so as to be able to move in a first axis direction and a second axis direction crossing the first axis direction, the slider member accommodating an imaging element; and first and second drive members that are disposed between the base plate and the slider member, wherein the first and second drive members are arranged to be symmetric with respect to a centroid of the slider member for moving the slider member in the first axis direction and the second axis direction.

The first axis direction and the second axis direction may be orthogonal to each other.

The first drive member may generate a driving force for moving the slider member in one of the first axis direction and the second axis direction.

The second drive member may generate a driving force for moving the slider member in the other one of the first axis direction and the second axis direction.

The slider member may be moved in the first axis direction by a driving force generated by the first drive member, with respect to the first axis direction and a driving force generated by the second drive member, with respect to the second axis direction.

The slider member may be moved in the second axis direction by a driving force generated by the first drive member, with respect to the second axis direction and a driving force generated by the second drive member, with respect to the second axis.

The first drive member may comprise: a first magnetism generating portion disposed on the slider member; a first coil disposed in the base plate; and a second coil disposed in the base plate, wherein the first magnetism generating portion is disposed on the first coil and the second coil so as to be spaced apart from the first coil and the second coil, a driving force being generated in the first axis direction due to the first magnetism generating portion and the first coil, and a driving force being generated in the second axis direction due to the first magnetism generating portion and the second coil.

The first magnetism generating portion may generate a first magnetic field to act on the first coil and a second magnetic field to act on the second coil.

The first magnetic field and the second magnetic field may be orthogonal to each other.

The driving force with respect to the first axis direction may be generated due to the first magnetic field and the first coil.

The driving force with respect to the second axis direction may be generated due to the second magnetic field and the second coil.

The second drive member may comprise: a second magnetism generating portion disposed on the slider member; a third coil disposed in the base plate; and a fourth coil disposed in the base plate, wherein the second magnetism generating portion is disposed on the third coil and the fourth coil so as to be spaced apart from the third coil and the fourth coil, a driving force is generated in the first axis direction due to the second magnetism generating portion and the third coil, and a driving force is generated in the second axis direction due to the second magnetism portion and the fourth coil.

The second magnetism generating portion may generate a third magnetic field to act on the third coil and a fourth magnetic field to act on the fourth coil.

The third magnetic field and the fourth magnetic field may be orthogonal to each other.

The driving force in the first axis direction may be generated due to the third magnetic field and the third coil.

The driving force in the second axis direction may be generated due to the fourth magnetic field and the fourth coil.

The slider member may comprise an accommodation portion for accommodating the imaging element.

The imaging element may be a lens or an imaging pickup device.

According to another aspect of the present invention, there is provided an imaging apparatus comprising the present shake correction module.

DETAILED DESCRIPTION OF THE EMBODIMENTS

Figure 1:
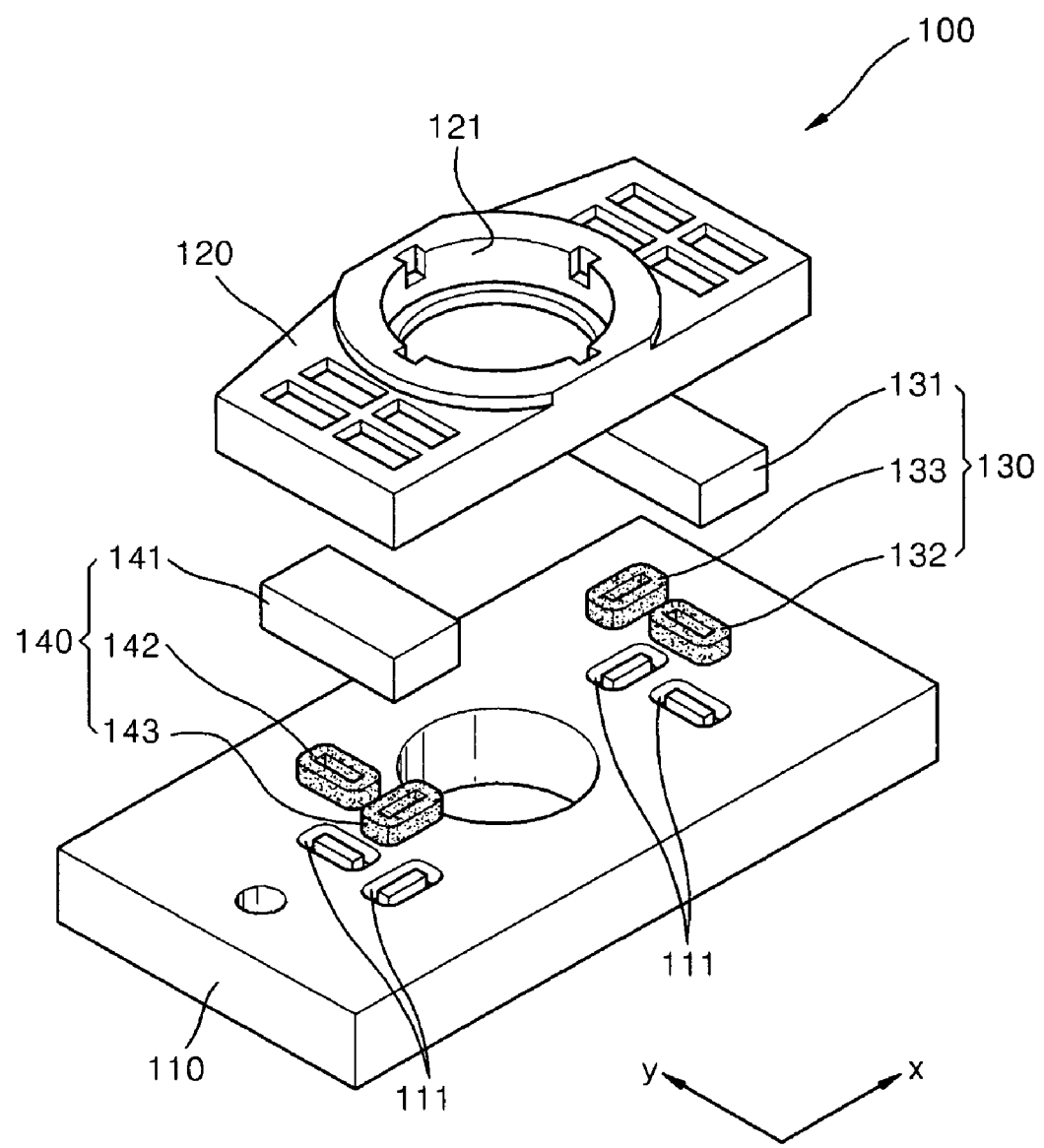
FIG. 1 is an exploded perspective view of a shake correction module for a photographing apparatus, according to an embodiment of the present invention.

The present invention will now be described more fully with reference to the accompanying drawings. In the drawings, the thicknesses of layers and regions are exaggerated for clarity. The same reference numerals in the drawings denote the same element.

Figure 2:
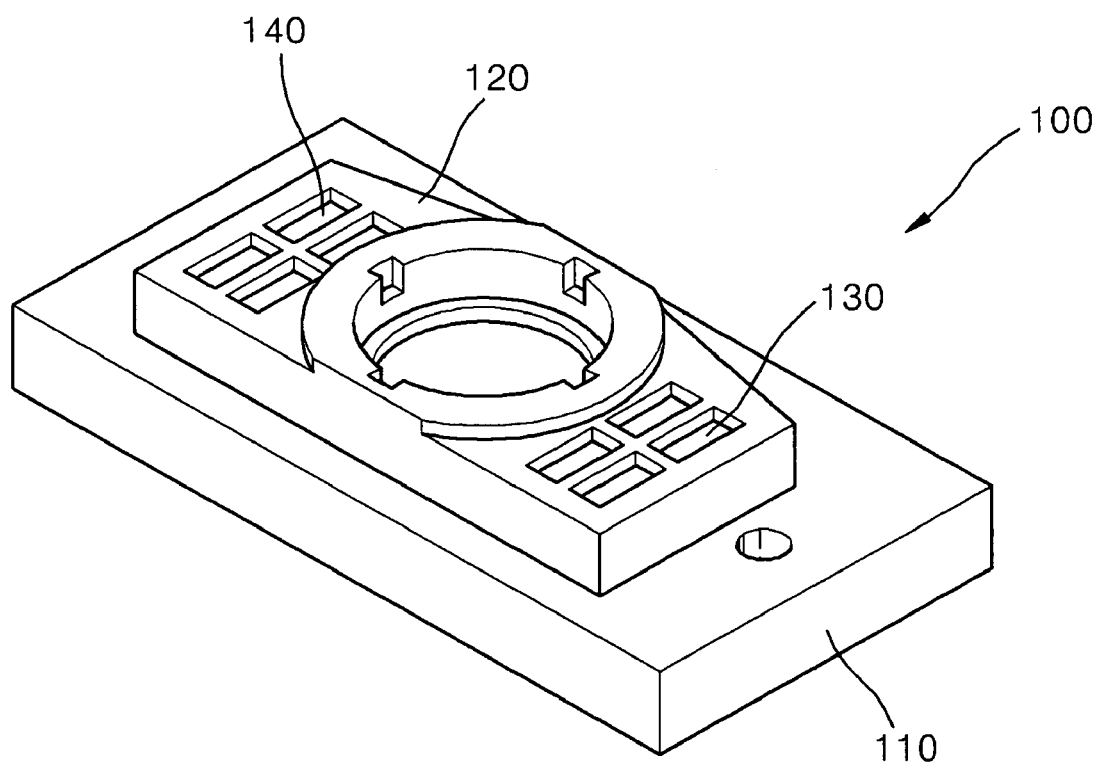
FIG. 2 is a perspective view of the shake correction module of FIG. 1.
Figure 2:
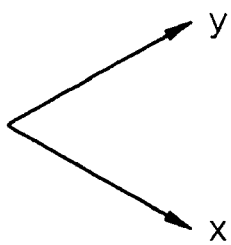
Figure 3A:
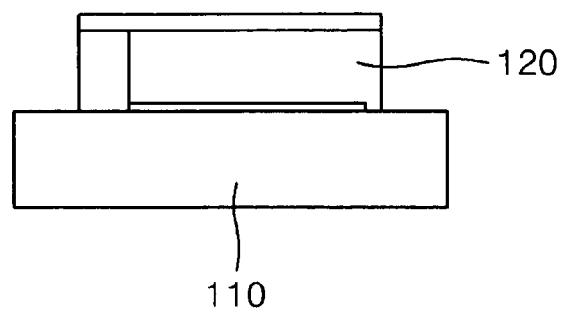
FIG. 3A is an end elevation view of the shake correction module of FIG. 1.
Figure 3B:
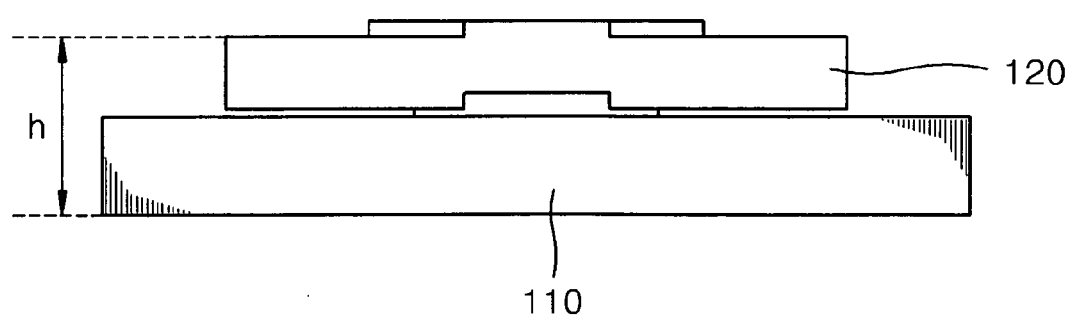
FIG. 3B is a side elevation view of the shake correction module of FIG. 1.
Figure 4:
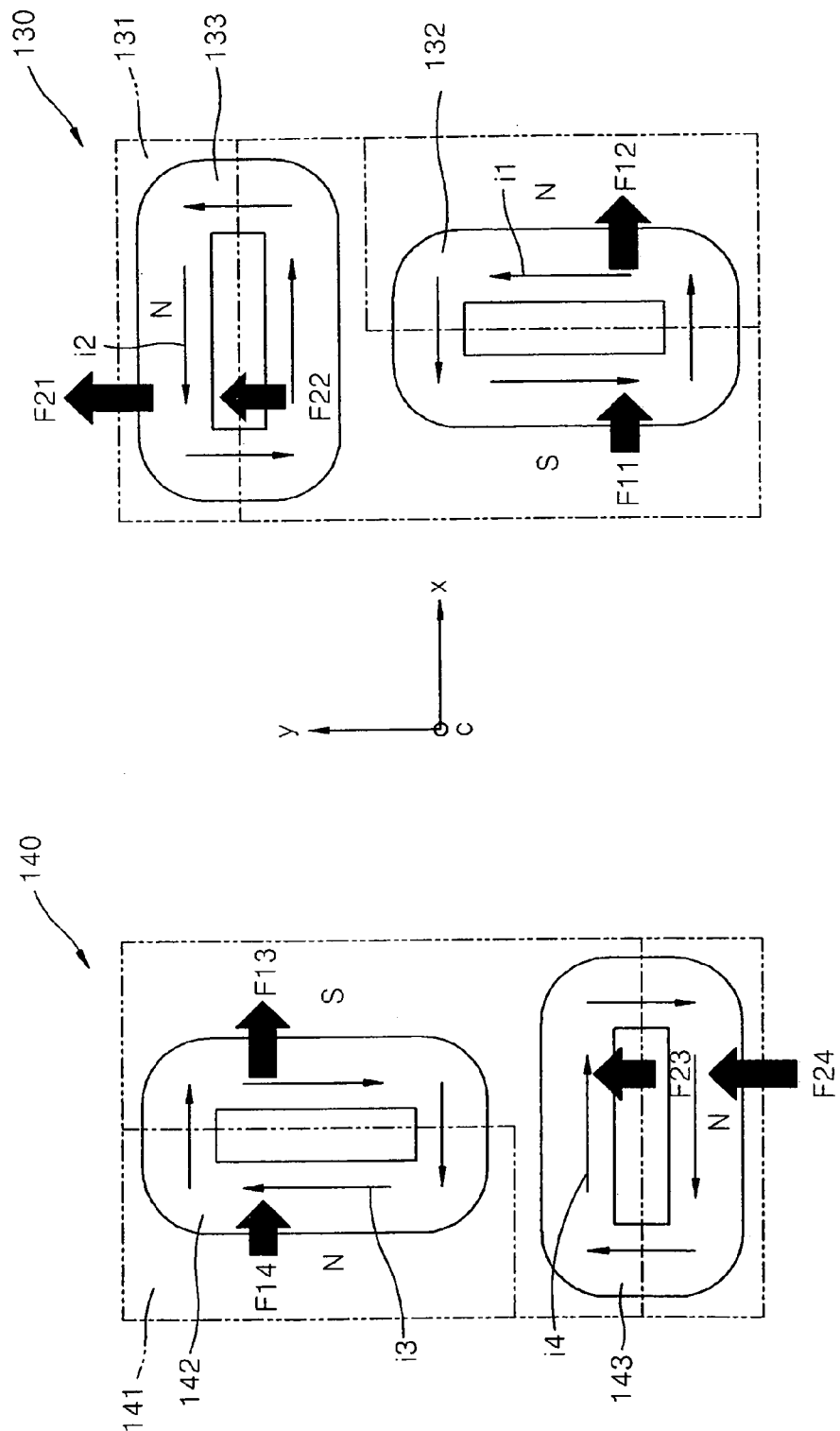
FIG. 4 is a plan view of first and second driving members illustrated in FIG. 1.
Figure 5:
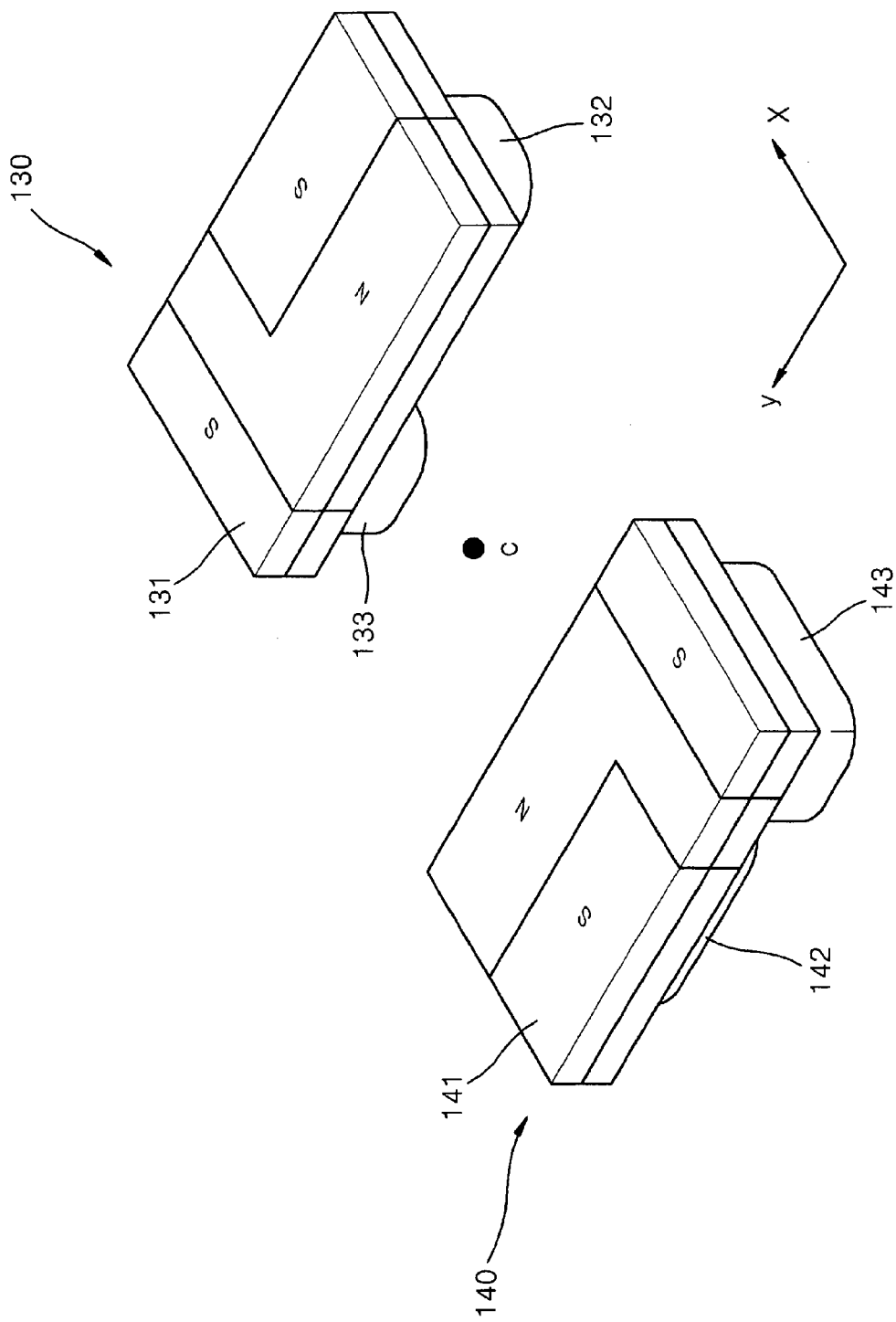
FIG. 5 is a perspective view further illustrating the first and second driving members shown in FIG. 4.

FIG. 1 is an exploded perspective view of a shake correction module 100 for a photographing apparatus, according to an embodiment of the present invention. FIG. 2 is a perspective view of the shake correction module 100 of FIG. 1. FIG. 3A is an end elevation view of the shake correction module 100 of FIG. 1. FIG. 3B is a side elevation view of the shake correction module 100 of FIG. 1. FIG. 4 is a plan view of first and second drive members 130 and 140 illustrated in FIG. 1. FIG. 5 is a perspective view of the first and second drive members 130 and 140 illustrated in FIG. 1.

Referring to FIGS. 1 through 4, the shake correction module 100 includes a base plate 110, a slider member 120, the first drive member 130, and the second drive member 140.

The base plate 110 is arranged at the lowermost side of the shake correction module 100 as shown in FIGS. 1 and 2. Although the base plate 110 is shown as being the lowermost part of the module 100, nevertheless, it should be appreciated that the module 100 may be oriented, configured or the like such that the base plate 110 is at the uppermost side or otherwise positioned. The base plate 110 is formed of metal or synthetic resin that has a relatively high rigidity. Accordingly, the base plate 110 functions as the main frame of the shake correction module 100, and can be fixed to a main body (e.g., housing or other internal support structure) of a photographing apparatus. The base plate 110 has a plate shape, and includes coil accommodation portions 111 (e.g., four as shown in FIG. 1) for respectively accommodating first through fourth coils 132, 133, 142 and 143 of the first and second drive members 130 and 140. The coil accommodation portions 111 (e.g., square or rectangular depressions with rounded corners) are formed in a surface of the base plate 110 that faces the slider member 120.

The slider member 120 is disposed on the base plate 110 and is movable on the base plate 110 in a first axis direction, and in a second axis direction crossing the first axis direction. The slider member 120 can be moved in the first axis direction or in the second axis direction, by the first drive member 130 and the second drive member 140. The first axis direction may be orthogonal to the second axis direction. Referring to FIGS. 1 and 2, the first axis direction is an x-axis direction, and the second axis direction is a y-axis direction.

The slider member 120 includes an accommodation portion 121 for accommodating an imaging element. The accommodation portion 121 may be formed in the center of the slider member 120. The imaging element may be a lens (not shown) or an imaging pickup device (not shown). First and second magnetism generating portions 131 and 141 of the first and second drive members 130 and 140, respectively, may be formed on a surface of the slider member 120 that faces the base plate 110. When the first and second magnetism generating portions 131 and 141 are moved, the slider member 120 is also moved, as will be described later.

The first drive member 130 and the second drive member 140 may be arranged between the slider member 120 and the base plate 110 so as to be symmetric with respect to a centroid (point "C" shown in FIGS. 4 and 5) of the slider member 120.

As best shown in FIGS. 4 and 5, the first and second drive members 130, 140 are configured as mirror images of each other with respect to the y-axis.

Each of the first drive member 130 and the second drive member 140 can generate a driving force for moving the slider member 120 independently in the first axis direction or in the second axis direction. That is, the first drive member 130 can generate the driving force for moving the slider member 120 not only in the first axis direction, but also in the second axis direction. In addition, the second drive member 140 can also generate the driving force for moving the slider member 120 not only in the first axis direction, but also in the second axis direction.

When the slider member 120 is moved in order to correct a shake, the first drive member 130 and the second drive member 140 operate as follows. When the slider member 120 is moved in the first axis direction due to a shake, one or both of the first drive member 130 and the second drive member 140 can generate the driving force with respect to the first axis direction. That is, the slider member 120 can be moved in the first axis direction due to a net force between the driving forces of the first and second drive members 130 and 140 in the first axis direction. In addition, when the slider member 120 is moved in the second axis direction due to a shake, one or both of the first drive member 130 and the second drive member 140 can generate the driving force with respect to the second axis direction. That is, the slider member 120 can be moved in the second axis direction due to a net force between the driving forces of the first and second drive members 130 and 140 in the second axis direction. Indeed, when the slider member 120 is moved due to a shake in a vector direction that is defined by a first axis component and a second axis component, the first and second drive members 130 and 140 can cooperate to move the slider member 120 to counteract the shake.

In a conventional shake correction module for a photographing apparatus, one drive element is used for moving a slider member in one direction. For example, a voice coil motor (VCM) is used for moving the slider member in an x-axis direction, and another VCM is used for moving the slider member in a y-axis direction. Since one drive element is used for moving the slider member in one direction, the slider member inclines to one side. Thus, a tilt, whereby an optical axis of a lens is inclined and a rotation whereby the slider member is rotated with respect to the optical axis of the lens, occurs, thereby deteriorating a shake correction function.

In contrast to the conventional shake correction module, the illustrated embodiment of the shake correction module 100 includes the first and second drive members 130 and 140 that can generate driving forces with respect to the x-axis direction (e.g., the first axis direction) and the y-axis direction (e.g., the second axis direction), and are arranged to be symmetric with the centroid of the slider member 120. Thus, the driving forces generated by the first and second drive members 130 and 140 can each be transferred to the centroid of the slider member 120. Accordingly, when the slider member 120 is moved by the first and second drive members 130, 140 to correct for the shake, the slider member 120 is not inclined to one side, and accordingly, tilt and rotation are minimized, thereby improving a shake correction function. In addition, since the slider member 120 can be moved due to the net force between the driving forces of the first drive member 130 and the second drive member 140, the intensity of the driving force for moving the slider member 120 can be increased, and a resultant force can be transferred to the slider member 120.

Moreover, in the shake correction module 100, since the first and second drive members 130 and 140 are disposed to be symmetric with respect to the centroid of the slider member 120, on a plane on which the centroid is disposed, the thickness "h" (see FIG. 3B) of the shake correction module 100 can be reduced, thereby reducing a size of a photographing apparatus that includes the shake correction module 100, as compared with the conventional shake correction module in which drive elements are disposed at an upper portion and a rear portion of the slider member, respectively.

The first drive member 130 includes the first magnetism generating portion 131, the first coil 132 and the second coil 133. The second drive member 140 includes the second magnetism generating portion 141, the third coil 142 and the fourth coil 143.

The first magnetism generating portion 131 and the second magnetism generating portion 141 are arranged on the surface of the slider member 120 that faces the base plate 110. The first magnetism generating portion 131 and the second magnetism generating portion 141 may be configured in generally rectangular recesses formed in the surface of the slider member 120 that faces the base plate 110. The first magnetism generating portion 131 and the second magnetism generating portion 141 may each be formed of a magnetic material, for example, a permanent magnet. The first and second magnetism generating portions 131 and 141 may be configured of a magnetic material, a plurality of magnetic materials, or a single or multiple magnets. When the first and second magnetism generating portions 131 and 141 are each composed of a magnetic material, the first and second magnetism generating portions 131 and 141 may each be separately magnetized, as will be described later.

The first through fourth coils 132, 133, 142 and 143 are accommodated in the coil accommodation portions 111 of the base plate 110, which are formed in the surface of the base plate 110 that faces the slider member 120. The first through fourth coils 132, 133, 142 and 143 may be accommodated in the coil accommodation portions 111 to be generally stationary with respect to the base plate 110.

The first and second magnetism generating portions 131 and 141 are separated from each other and are configured on opposite ends of the slider member 120. Similarly, the first and second coils 132, 133 are separated from the third and fourth coils 142 and 143 along the base plate 110. As will be described hereinafter, the first and second magnetism generating portions 131 and 141 are moved in accordance with currents flowing through the first through fourth coils 132, 133, 142 and 143.

The first magnetism generating portion 131 generates a first magnetic field to act on the first coil 132 and a second magnetic field to act on the second coil 133. The second magnetism generating portion 141 generates a third magnetic field to act on the third coil 142 and a fourth magnetic field to act on the fourth coil 143. The directions of the first and second magnetic fields may be orthogonal to each other, and the directions of the third and fourth magnetic fields may be orthogonal to each other.

In order to generate the first through fourth magnetic fields, the first and second magnetism generating portions 131 and 141, each of which is composed of a magnetic material, may each be separately magnetized as is best illustrated in FIG. 5. That is, the first and second magnetism generating portions 131 and 141 may each be magnetized so as to exhibit various polarities on surfaces of each of the first and second magnetism generating portions 131 and 141. Referring to FIG. 5, N and S poles respectively correspond to right and left areas of a portion of a surface of the first magnetism generating portion 131, which corresponds to the first coil 132. N and S poles respectively correspond to upper and lower areas of a portion of the surface of the first magnetism generating portion 131, which corresponds to the second coil 133. As shown, the N pole portion of the first magnetism generating portion 131 is generally L-shaped, whereas the two S pole portions (which, together with the L-shaped N pole portion, form a generally rectangular first magnetism generating portion 131) are generally rectangular.

The first and second magnetism generating portions 131 and 141, each of which is composed of a magnetic material, are each separately magnetized, but the present invention is not limited thereto. That is, the first and second magnetism generating portions 131 and 141 may be composed of a plurality of magnetic materials (or a plurality of distinct magnets) that generate magnetic fields whose directions are orthogonal to each other.

A Lorenz force is generated due to the magnetic fields generated by the first and second magnetism generating portions 131, 141 and currents flowing through the first through fourth coils 132, 133, 142 and 143. In this regard, the Lorentz force can act as driving forces of the first and second drive members 130 and 140 to move the slider member 120.

As can be appreciated, a first Lorentz force is generated when a current flows through one or both of the first and second coils 132 and 133 that exist in the magnetic fields generated by the first magnetism generating portion 131. In addition, a second Lorentz force is generated when a current flows through one or both of the third and fourth coils 142 and 143 that exist in the magnetic fields generated by the second magnetism generating portion 141. Since the first through fourth coils 132, 133, 142 and 143 are generally stationary (being disposed in accommodation portions 111 in the base plate 110), the first and second magnetism generating portions 131 and 141 are moved due to the resultant Lorentz force. Since the first and second magnetism generating portions 131 and 141 are disposed on the slider member 120, the slider member 120 is moved in accordance with the movement of the first and second magnetism generating portions 131 and 141.

The Lorentz force between the first magnetism generating portion 131 and the first coil 132 may be generated in the first axis direction (e.g., the x-axis direction), and the Lorentz force between the first magnetism generating portion 131 and the second coil 133 may be generated in the second axis direction (e.g., the y-axis direction). In addition, the Lorentz force between the second magnetism generating portion 141 and the third coil 142 may be generated in the first axis direction (e.g., the x-axis direction), and the Lorentz force between the second magnetism generating portion 141 and the fourth coil 143 may be generated in the second axis direction (e.g., the y-axis direction).

Thus, in order to move the slider member 120 in the first axis direction (e.g., the x-axis direction), currents are supplied to the first coil 132 and the third coil 142. In addition, in order to move the slider member 120 in the second axis direction (e.g., the y-axis direction), currents are supplied to the second coil 133 and the fourth coil 143.

FIG. 4 is a plan view of the first and second driving members 130 and 140 illustrated in FIG. 1 with the first and second magnetism generating portions 131, 141 being shown in phantom lines. FIG. 4 illustrates the directions of the driving forces for moving the slider member 120, when currents flow through the first through fourth coils 132, 133, 142 and 143.

Referring to FIG. 4, the first magnetism generating portion 131 includes N pole portion corresponding to a right portion of the first coil 132. Accordingly, when a current i1 flows counterclockwise through the first coil 132, a driving force F11 is generated in the first axis direction (e.g., the x-axis direction) according to Fleming's left hand rule. In addition, the first magnetism generating portion 131 includes S pole portion corresponding to a left portion of the first coil 132. Accordingly, when the current i1 flows counterclockwise through the first coil 132, a driving force F12 is generated in the first axis direction (e.g., the x-axis direction) according to Fleming's left hand rule. Turning now to the second drive member 140, one can appreciate that S pole portion of the second magnetism generating portion 141 corresponds to the right portion of the third coil 142. Accordingly, when a current i3 flows clockwise through the third coil 142, a driving force F13 is generated in the first axis direction (e.g., the x-axis direction) according to Fleming's left hand rule. In addition, N pole portion of the second magnetism generating portion 141 corresponds to the left portion of the third coil 142. Accordingly, when the current i3 flows clockwise through the third coil 142, a driving force F14 is generated in the first axis direction (e.g., the x-axis direction) according to Fleming's left hand rule. Accordingly, the slider member 120 can be moved in the first axis direction due to the net force of the driving forces F11, F12, F13 and F14.

Since the N pole corresponds to the upper portion of the second coil 133 of the first drive member 130, when a current i2 flows counterclockwise through the second coil 133, a driving force F21 is generated in the second axis direction (e.g., the y-axis direction) according to Fleming's left hand rule. In addition, since the S pole corresponds to the lower portion of the second coil 133, when the current i2 flows counterclockwise through the second coil 133, a driving force F22 is generated in the second axis direction (e.g., the y-axis direction) according to Fleming's left hand rule. Likewise, since the S pole corresponds to the upper portion of the fourth coil 143 of the second drive member 140, when a current i4 flows clockwise through the fourth coil 143, a driving force F23 is generated in the second axis direction (e.g., the y-axis direction) according to Fleming's left hand rule. In addition, since the N pole corresponds to the lower portion of the fourth coil 143, when a current i4 flows clockwise through the fourth coil 143, a driving force F24 is generated in the second axis direction (e.g., the y-axis direction) according to Fleming's left hand rule. Accordingly, the slider member 120 can be moved in the second axis direction (e.g., the y-axis direction) due to a net force of the driving forces F21, F22, F23, and F24.

By changing the direction of a current, the direction of a driving force can be changed. That is, when the direction of the current i1 flowing through the first coil 132 is changed to a clockwise direction, the direction of the driving force is changed into a negative first axis (e.g., x-axis) direction. Similarly, when the direction of the current i3 flowing through the third coil 142 is changed into a counterclockwise direction, the direction of the driving force is changed into a negative first axis (e.g., x-axis) direction. Likewise, by changing the directions of currents flowing through the second coil 133 and the fourth coil 143, the direction of the driving forces can be changed to be opposite of the illustrated forces shown in FIG. 4. Indeed, it can be appreciated that the currents in the coils may be controlled to cause the slider member 120 to move in various directions (e.g., the x- and y-axis directions or diagonally—with both x- and y-axis components).

Hereinafter, the operations of the shake correction module 100 illustrated in FIG. 1 will be described.

When a shake occurs during photographing, the shake is detected by a shake detection unit (not shown) provided in a photographing apparatus.

A gyro sensor or an acceleration sensor can be used as the shake detection unit. Data relating to the amount and direction of the shake measured by the shake detection unit is transferred to a control circuit board (not shown). The shake detection unit may be configured with or separately from the control circuit board.

The control circuit board calculates the necessary amount of movement of the slider member 120 where an imaging device (not shown) is accommodated to correct the detected shake. The calculated amount of movement of the control circuit board is measured in terms of movements in the x-axis and y-axis directions.

Next, the control circuit board drives the first and second drive members 130 and 140 based on the calculated amount of movement in the x-axis and y-axis directions so that the slider member 120 is moved based on the calculated amount of movement. More specifically, the control circuit board causes various currents to flow (in various directions) through one or more of the coils 132, 133, 142, 143 of the drive members 130, 140.

For example, the control circuit board may drive the first drive member 130 in order to move the slider member 120 in the x-axis direction such that the slider member 120 is linearly moved along a first axis (x-axis).

In addition, the control circuit board may drive the second drive member 140 in order to move the slider member 120 in the y-axis direction such that the slider member 120 is linearly moved along a second axis (y-axis).

The movements of the slider member 120 in the x-axis and y-axis directions may be measured using a movement measuring magnet (not shown) and a hall sensor (not shown). The measured data is transferred to the control circuit board to be used as a feedback signal to control the first and second drive members 130 and 140. As described above, when the slider member 120 is appropriately moved in a direction to correct for the shake, the imaging device accommodated in the slider member 120 is moved so that the shake correction is performed during photographing.

According to the above embodiments, a shake correction module for a photographing apparatus can be used in an imaging device. The imaging device may be a device having various kinds and forms, such as a digital compact camera, a single-lens reflex camera, an image camcorder or a film-type camera.

According to the above embodiments, the shake correction module can be miniaturized, thereby improving a shake correction function.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A shake correction module for a photographing apparatus, the shake correction module comprising:
   a base plate;
   a slider member disposed on the base plate, the slider member being movable on the base plate in a first axis direction and a second axis direction crossing the first axis direction, the slider member being configured to accommodate an imaging element; and
   first and second drive members that are disposed between the base plate and the slider member;
   wherein the first drive member comprises first and second coils located under a first magnetism generating portion that is a single structure;

wherein the single magnet structure comprises a first magnetic field to act on the first coil and a second different magnetic field to act on the second coil;

wherein the second drive member comprises third and fourth coils located under a second magnetism generating portion that is a single magnet structure.

2. The module of claim 1, wherein the first axis direction and the second axis direction are crossing each other.

3. The module of claim 1, wherein the first drive member is configured to generate a driving force for moving the slider member in the first axis direction and in the second axis direction.

4. The module of claim 3, wherein the second drive member is configured to generate a driving force for moving the slider member in the first axis direction and the second axis direction.

5. The module of claim 1, wherein the slider member is movable in the first axis direction by a resultant first axis force, the resultant first axis force being defined by a driving force generated by the first drive member with respect to the first axis direction, and a driving force generated by the second drive member with respect to the first axis direction.

6. The module of claim 1, wherein the slider member is movable in the second axis direction by a resultant second axis force, the resultant second axis force being defined by a driving force generated by the first drive member with respect to the second axis direction, and a driving force generated by the second drive member with respect to the second axis.

7. The module of claim 1, wherein:
the first coil is disposed in one of the base plate and the slider member;
the second coil is disposed in one of the base plate and the slider member; and
the first magnetism generating portion is disposed on a portion of an other of the base plate and the slider member that corresponds to the first coil and the second coil,
wherein a first axis direction driving force is generated by the first magnetism generating portion and the first coil, and
wherein a second axis direction driving force is generated by the first magnetism generating portion and the second coil.

8. The module of claim 1, wherein directions of the first magnetic field and the second magnetic field are crossing to each other.

9. The module of claim 1, wherein the first axis driving force is generated by magnetic interaction between the first magnetic field and the first coil.

10. The module of claim 1, wherein the second axis driving force is generated by magnetic interaction between the second magnetic field and the second coil.

11. The module of claim 7, wherein the first magnetism generating portion comprises:
a first permanent magnet having N and S poles corresponding with one of the first and second coils; and
a second permanent magnet having N and S poles corresponding with the other one of the first and second coils.

12. The module of claim 7, wherein:
the third coil is disposed in one of the base plate and the slider member;
the fourth coil is disposed in one of the base plate and the slider member; and
the second magnetism generating portion is disposed on a portion of an other of the base plate and the slider member that corresponds to the third coil and the fourth coil,
wherein a first axis direction driving force is generated by the second magnetism generating portion and the third coil, and
wherein a second axis direction driving force is generated by the second magnetism generating portion and the fourth coil.

13. The module of claim 12, wherein the second magnetism generating portion generates a third magnetic field to act on the third coil and a fourth magnetic field to act on the fourth coil.

14. The module of claim 13, wherein directions of the third magnetic field and the fourth magnetic field are crossing each other.

15. The module of claim 13, wherein the first axis direction driving force is generated by magnetic interaction between the third magnetic field and the third coil.

16. The module of claim 13, wherein the second axis direction driving force is generated by magnetic interaction between the fourth magnetic field and the fourth coil.

17. The module of claim 12, wherein the second magnetism generating portion comprises:
a first permanent magnet having N and S poles corresponding with one of the third and fourth coils; and
a second permanent magnet having N and S poles corresponding with the other one of the third and fourth coils.

18. The module of claim 1, wherein the slider member comprises an accommodation portion for accommodating the imaging element.

19. The module of claim 1, wherein the imaging element is a lens or an imaging pickup device.

20. The module of claim 1, wherein the slider member is asymmetrical about at least one axis.

21. The module of claim 1, wherein the slider member covers a top surface of the first magnetism driving portion.

22. The module of claim 1, wherein:
the first coil is disposed in the base plate;
the second coil is disposed in the base plate; and
a top surface of the base plate and a top surface of the coils are generally coplanar.

23. The module of claim 22, wherein a bottom surface of the slider member is generally parallel to a top surface of the base plate.

24. The module of claim 1, wherein a bottom surface of the slider member is generally parallel to a top surface of the base plate.

25. A shake correction apparatus comprising:
a correction lens;
a correction lens supporting plate configured to be moveable along a first axis crossing an optical axis of the correction lens and along a second axis crossing the optical axis and the first axis;
a base configured to movably support the correction lens supporting plate; and
first and second driving units arranged having center points on opposite sides of the first axis and on opposite sides of the second axis, and configured to collectively move the correction lens module along the first axis.

26. The shake correction apparatus of claim 25, further comprising third and fourth driving units arranged having center points on opposite sides of the second axis, and configured to collectively move the correction lens module along the second axis.

27. The shake correction apparatus of claim 26 wherein the third and fourth driving units are arranged having center points on opposite sides of the first axis.

28. The shake correction apparatus of claim 23, wherein a driving force created by the first driving unit is crossing a driving force created by the third driving unit.

29. The shake correction apparatus of claim 25, wherein the correction lens supporting plate comprises the correction lens and a magnet disposed in the correction lens supporting plate, and wherein each of the first and third driving units comprises a coil disposed on the base facing the magnet.

* * * * *

UNITED STATES PATENT AND TRADEMARK OFFICE
CERTIFICATE OF CORRECTION

PATENT NO. : 8,300,105 B2
APPLICATION NO. : 12/378228
DATED : October 30, 2012
INVENTOR(S) : Kwang-seok Byon et al.

Page 1 of 1

It is certified that error appears in the above-identified patent and that said Letters Patent is hereby corrected as shown below:

IN THE CLAIMS:

In Claim 1, Column 8, line 67, replace "a single structure" with -- a single magnet structure --

In Claim 6, Column 9, line 24, replace "The module of claim 1" with -- The module of claim 5 --

Signed and Sealed this
Twelfth Day of November, 2013

Teresa Stanek Rea
*Deputy Director of the United States Patent and Trademark Office*